United States Patent [19]

Kurihara et al.

[11] Patent Number: 4,478,717

[45] Date of Patent: Oct. 23, 1984

[54] SEMIPERMEABLE MEMBRANE TREATED WITH MODIFIED VINYL POLYMER

[75] Inventors: Masaru Kurihara; Noriho Harumiya, both of Ohtsu; Tadahiro Uemura, Kyoto, all of Japan

[73] Assignee: Toray Industries, Inc., Tokyo, Japan

[21] Appl. No.: 382,566

[22] Filed: May 27, 1982

Related U.S. Application Data

[63] Continuation of Ser. No. 177,239, Aug. 11, 1980, abandoned.

[51] Int. Cl.$^3$ .............................................. B01D 31/00
[52] U.S. Cl. .................................. 210/500.2; 210/506
[58] Field of Search ............... 210/634, 638, 639, 654, 210/500.2, 506; 427/244, 245, 246; 521/27, 141

[56] References Cited

U.S. PATENT DOCUMENTS

| | | | |
|---|---|---|---|
| 3,220,960 | 11/1965 | Wichterle et al. | 260/2.5 |
| 3,556,305 | 1/1971 | Shorr | 210/490 |
| 3,877,978 | 4/1975 | Kremen et al. | 210/23 |
| 3,962,158 | 6/1976 | Mima et al. | 260/17.4 |

OTHER PUBLICATIONS

U.S. Department of Commerce Patent Examiner Academy Notebook, Topic 7d, Formality Term List, (two pp.), 10/25/1977.

*Primary Examiner*—David Sadowski
*Attorney, Agent, or Firm*—Austin R. Miller

[57] ABSTRACT

A membrane treating agent for rejuvenating and improving a rejection performance of a semipermeable membrane, which contains an effective amount of a modified vinyl polymer having acetoxy groups and at least one group represented by the Formula (I) and/or (II):

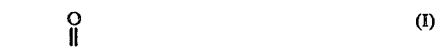

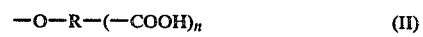

wherein R is a radical selected from the group consisting of aliphatic, aromatic and heterocyclic radicals having from 1 to 9 carbon atoms, and n is an integer from 1 to 3.

Valuable modified vinyl polymers are obtained by reacting a partially saponified vinyl polymer with at least one carboxylic acid such as maleic acid, phthalic acid, succinic acid, butane tetracarboxylic acid and/or acid anhydrides or acid chlorides thereof.

23 Claims, 1 Drawing Figure

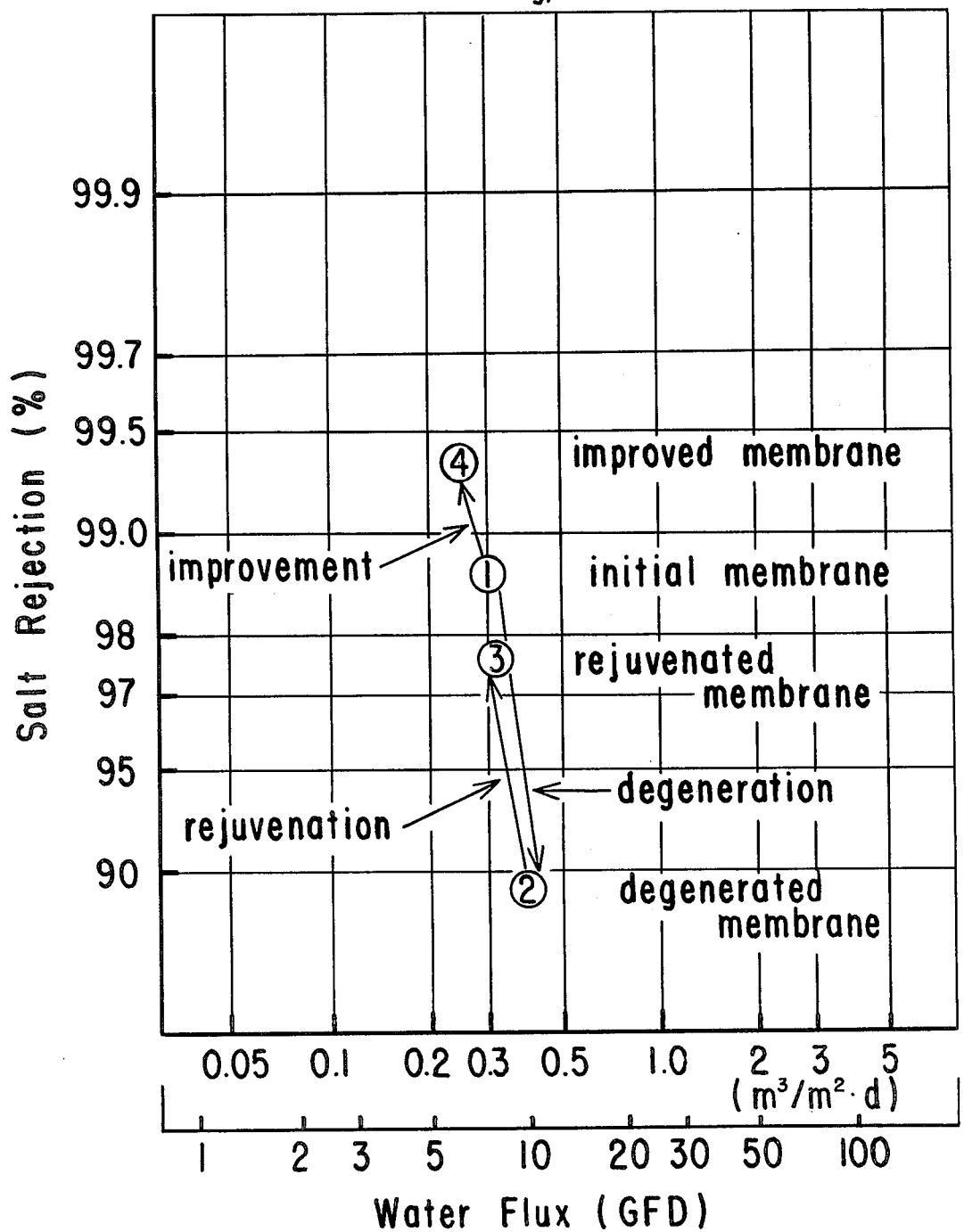

SEMIPERMEABLE MEMBRANE TREATED WITH MODIFIED VINYL POLYMER

This is a continuation of application Ser. No. 177,239 filed Aug. 11, 1980, abandoned.

This invention relates to a membrane treating agent for rejuvenating or regenerating and improving semipermeable membrane performance, especially for reverse osmosis and ultrafiltration membranes, to a membrane treated by the membrane treating agent and also to a treatment process using the membrane treating agent.

In recent years, much research and development has taken place in an effort to obtain an excellent semipermeable membrane which is useful for producing fresh or potable water from such sources as sea water or brackish water, for the treatment of polluted water, for the concentration of orange juice or milk and for the recovery of useful materials from such sources as metal plating sewage or electrodeposition painting sewage. This is desirable because such procedures are in need of no phase transition, no temperature change and use less energy than other purification methods.

In general, the membrane performance of a reverse osmosis membrane is expressed in terms of both solvent permeability and solute rejection. Solvent permeability is the quantity of permeated solvent per unit period and unit area, generally in terms of $m^3/m^2$ day. Solute rejection (%) is calculated as follows:

$$\text{Solute Rejection (\%)} = \left(1 - \frac{C}{C_o}\right) \times 100$$

wherein $C_o$ is the concentration of solute in the feed solution and C is the concentration of solute in the permeated solution.

At the present time, semipermeable membranes produced for reverse osmosis are composed of either asymmetric membranes or composite membranes.

Asymmetric membranes have been produced from various polymeric materials such as cellulose derivatives, polyamides, polyimides, polybenzimidazoles, polyarylene oxides, polysulfoneamides and other polymeric materials, in which the semipermeability of the membrane results from the function of a thin dense skin layer located at one surface of the membrane, with the remaining major part of the membrane providing a more porous supporting layer formed by the same polymer.

On the other hand, the composite membranes such as those called "PA-300" and NS-200", etc. have been developed recently, wherein the semipermeability results from the function of an ultrathin solute barrier layer of one material which is formed separately and is supported on an underlying porous substrate that may be made from a different polymer from the ultrathin film.

The performance of the membrane is determined by the thickness of the thin dense skin layer or the ultrathin solute barrier layer. Accordingly, a thinner layer leads the membrane to higher performance, especially in respect of solvent permeability.

It is accordingly difficult to obtain a high performance semipermeable membrane having good solute rejection, because the thin dense skin layer or the ultrathin solute barrier layer possesses poor resistance to deformation and abrasion at the time of membrane fabrication and of membrane element fabrication. In addition, when a semipermeable membrane made of cellulose acetate has been used for substantial periods of time, the decrease of rejection performance of the membrane may have been caused by hydrolysis of the membrane. Moreover, when semipermeable membranes or membrane elements are free of faults, defects in the thin dense skin layer or the ultrathin solute barrier layer may be caused by minor mechanical shocks or deformation during long term operation of reverse osmosis or ultrafiltration. Therefore, it is important to be able to treat the membrane with a supplemental material in order to improve or to rejuvenate the solute rejection performance of the membrane.

Various materials have been hitherto proposed for improving the rejection performance of semipermeable membranes. For example, U.S. Pat. No. 3,877,978 discloses such treatment using a supplemental polymeric material containing a substantial amount of acetyl groups comprising a copolymer of vinyl acetate and acids such as maleic acid, crotonic acid and lower alkyl esters of acrylic acid.

G. L. Dalton et al have recently reviewed the supplemental polymer coatings in reverse osmosis improvement and regeneration in "DESALINATION" 24, 235 (1978). But these materials could only be applied for rejuvenating a membrane which has degenerated over long term operation, or which has a mechanical defect.

It is an object of the present invention to provide a membrane treating agent which is useful not only for rejuvenation of a degenerated semipermeable membrane but also for improvement of the semipermeable membrane without proportional decrease in the flow rate of water therethrough. Another object of the present invention is to provide a membrane treating agent which can be applied without troublesome procedures in use.

In accordance with the present invention, the yield rate of the membrane and of the element can be heightened by applying the membrane treatment for overcoming the defects. The useful life of the membrane can be lengthened by means of the rejuvenation treatment. A high performance, particularly rejection performance of the membrane, can be attained with a membrane treating agent of this invention to the previously unattained level of normal membrane fabrication methods.

In the description which follows specific characterizations will be used and reference will be had to drawings and to specific examples all in the interest of clarity of explanation. These terms and references are not intended to define or to limit the scope of the invention, which is defined in the appended claims.

IN THE DRAWINGS

The FIGURE is a diagram showing change of the membrane performance of a semipermeable membrane treated with a membrane treating agent of the present invention. In the drawing, (1) represents initial membrane performance;
(2) represents degenerated membrane performance;
(3) represents rejuvenated membrane performance, and
(4) represents improved membrane performance.

Referring now to the modified vinyl polymers which are effective for rejuvenating and improving a rejection performance of semipermeable membranes in accordance with the present invention, each has an acetoxy group and at least one group comprising either or both of the Formulas (I) and (II):

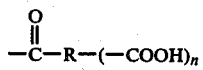  (I)

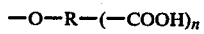  (II)

wherein R is a radical selected from the group consisting of aliphatic, aromatic and heterocyclic radicals having 1 to 9 carbon atoms, and n is an integer from 1 to 3.

Examples of groups represented by the Formula (I) are the following groups represented by the Formulas (A) to (G), the preferable ones being (A) and (B):

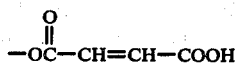  (A)

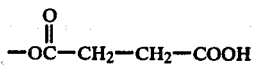  (B)

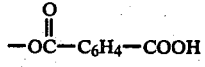  (C)

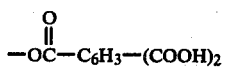  (D)

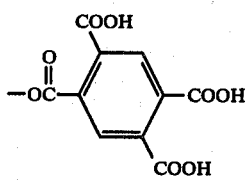  (E)

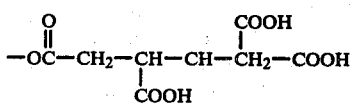  (F)

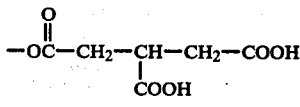  (G)

Examples of the groups represented by Formula (II) are the following:

  (H)

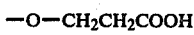  (I)

The modified vinyl polymers can be derived from homopolymers or copolymers of vinyl acetate. Ethylene, vinyl chloride, styrene, N-vinyl pyrrolidone etc. can be employed as a comonomer with vinyl acetate.

In the concrete, the modified vinyl polymers of the present invention are polymers having repeating units represented by the Formula (III) as the polymer main chain:

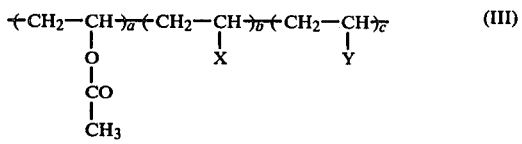  (III)

wherein a, b and c are molar fractions which satisfy the following equations:

$$a + b + c = 1 \quad \begin{array}{l} 0.9 > a > 0.2 \\ 0.8 > b > 0.1 \\ 0.4 > c \geq 0 \end{array}$$

and wherein X is at least one radical selected from the group represented by the Formulas (I) and (II) and Y is at least one radical selected from the group consisting of —OH, —H, —Cl, —Br, —I, —$C_6H_5$, and

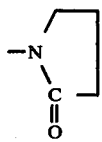

Such groups represented by the Formulas (I) and (II) alter the vinyl polymer into a water soluble vinyl polymer having excellent affinity and adsorption-ability for semipermeable membranes, particularly for membranes made of cellulose acetate.

By adding a semipermeable membrane with an effective amount of a modified vinyl polymer containing an acetoxy group and a group represented by the Formulas (I) and (II), the rejection performance of the membrane can be remarkably potentiated, even if the modified vinyl polymer is not insolubilized. The modification is well achieved by reacting polyvinyl acetate, its copolymers and their partially or fully saponified polymers, with at least one compound selected from the group consisting of dibasic acids, tribasic acids, tetrabasic acids, acid anhydrides thereof and/or acid chlorides thereof.

The more preferred modified vinyl polymers used in the present invention are modified polymers having the group represented by the Formula (A) or (B) and are obtained by reacting a partially saponified vinyl acetate with maleic anhydride or succinic anhydride. The molar fractions a, b and c in the modified vinyl polymer represented by the Formula (III) should satisfy the aforementioned equations, and should preferably satisfy the following equation:

$0.8 > a > 0.4$ $0.4 > b > 0.1$ $0.2 > c \geq 0$

When the molar fractions a, b and c do not satisfy the above equations, it is not possible to obtain a modified vinyl polymer having good water solubility and excellent capacity for rejuvenating or improving the rejection performance of the membrane. Such modified vinyl polymers can be easily prepared by methods well known in prior art, for example those disclosed in Japanese Patent Publication No. 16,150/1965. One of the representative methods for preparing the modified vinyl polymers is as follows:

(1) hydrolysing or saponifing a polyvinyl acetate with aqueous alkali or acid solutions, (2) reacting a partially saponified polyvinyl acetate with various carboxylic acids, for example, a dibasic acid such as succinic acid, maleic acid, phthalic acid, tribasic acids such as propane tricarboxylic acid, trimellitic acid, tetrabasic acids such as butane tetracarboxylic acid and pyrromellitic acid, and their acid anhydrides and their acid halides as well.

The modified vinyl polymers of the present invention may also be obtained by reacting a partially saponified polyvinyl acetate with acrylonitrile or cyan ions and formaldehyde, and then hydrolysing the resulting cyanomethylated of cyanoethylated polyvinyl acetate. The water solubility of the modified vinyl polymers obtained by reacting the partially saponified polyvinyl acetate with the carboxylic acids depends on the reaction ratio of the carboxylic acids to the partially saponified vinyl polymers. When the reaction ratio of the carboxylic acids to the partially saponified vinyl acetate is lower, the solubility of the modified vinyl polymers becomes poor. However, these modified vinyl polymers can be converted to water soluble polymers by controlling the pH in an aqueous solution by adding alkali hydroxides such as sodium hydroxide, potassium hydroxide or ammonium hydroxide, organic amines, etc. By changing the water solubility (pH) of the modified vinyl polymers before and after treating the semipermeable membrane, rejection performance and performance durability of the semipermeable membrane can be controlled. But the modified vinyl polymers of the present invention have such good affinity and absorption-ability relative to the semipermeable membrane, that the membrane treating effect does not disappear even after long-term operation.

The content of acetoxy groups contained in the modified vinyl polymers is preferably within the range of about 20 to 90 mol%, more preferably about 40 to 80 mol% relative to the repeating units of the modified vinyl polymer chain. The insolubilization or fixation of the modified vinyl polymers may be achieved by treating various reagents which have reactivity to the groups represented by the Formula (I). Examples of such reagents include multivalent isocyanates, multivalent alcohols, multivalent organic amines, etc.

The mebrane treating agent of the present invention may be applied to semipermeable membranes having various shapes such as films, tubes, or hollow fibers, or Loeb type asymmetric or composite membranes which comprise various organic polymers such as cellulose esters, polyamides, polybenzimidazoles, etc. The membrane treating agents of the present invention give an excellent effect to the semipermeable membrane comprising cellulose esters, particularly cellulose acetate.

The membrane treating agents of the present invention are employed as either aqueous solutions, organic solvent solutions or dispersions, etc. containing an effective amount of the modified vinyl polymer. However, the membrane treating agents are usually used as aqueous solutions containing about 0.0001 to 1.0% by weight, preferably about 0.0003 to 0.01% by weight of the modified vinyl polymer. The pH of such aqueous solution is preferably about 3 to 9, more preferably about 4 to 8. The addition of surfactant to the aqueous solution may give good effects in some cases.

Membrane treating can be achieved by well-known methods, for example dipping the membrane into the aqueous solution containing the membrane treating agent, spraying the aqueous solution on the membrane or, more easily, the membrane treating agent may be added to the feed solution during the operation of the reverse osmosis or ultrafiltration procedure.

The following Examples are illustrative of the invention:

EXAMPLE 1

A modified vinyl polymer was prepared by reacting partially saponified polyvinyl acetate with maleic anhydride as follows:

10 grams of partially saponified polyvinyl acetate (average molecular weight (MW): 1700, degree of saponification: 40%) was dissolved in 100 milliliters of dimethylsulfoxide, after which 20 grams of maleic anhydride were added and stirred for 24 hours at room temperature. A white polymeric material was obtained by mixing the aforementioned solution with 500 milliliters of water. This material was filtered, washed with 100 milliliters of water and then dried for 24 hours in a vacuum.

This polymer was dissolved in dilute ammonia water and was stored as a 10% solution having a pH of 7, at room temperature. The infrared spectra of this polymer showed strong absorption at 1730 cm$^{-1}$ (ester linkage $\nu$ C=O) and 1240 cm$^{-1}$ (esteric $\nu$ C—O), and a new absorption at 1575 cm$^{-1}$ (ionic carboxylate).

EXAMPLE 2

A cellulose acetate asymmetric reverse osmosis membrane was evaluated under the following conditions:

| Feed | 3.5% sodium chloride |
| --- | --- |
| Temperature | 25° C. |
| Operating pressure | 56 Kg/cm$^2$ |
| Flow Rate | 1 m/sec. |

Initially, the asymmetric membrane exhibited a salt rejection of 98.7% and a water flux of 0.30 m$^3$/m$^2$ day. The modified vinyl polymer obtained in Example 1 was added to a feed solution (3.5% sodium chloride) so that the polymer was supplied to the membrane at about 100 ppm while the evaluation was continued. After an hour, salt rejection improved to 99.35% and water flux was reduced to 0.25 m$^3$/m$^2$ day. After this the feed solution was changed to fresh 3.5% sodium chloride; performance improved by the treatment was maintained even after 24 hours test.

This effect is illustrated in the drawing. The number (1) designates initial membrane performance, and (4) in the drawing is improved membrane performance after treatment by this Example.

EXAMPLE 3

A modified vinyl polymer was prepared by using succinic anhydride instead of maleic anhydride. The other conditions were the same as Example 1.

The cellulose acetate asymmetric reverse osmosis membrane before treatment exhibited a salt rejection of 97.27% and a water flux of 0.36 m$^3$/m$^2$ day under the same conditions as Example 2.

Membrane treatment was accomplished by adding the modified vinyl polymer to the feed solution at 10 ppm, while the evaluation was continued. After 24 hours the salt rejection improved to 99.37% and the water flux was reduced to 0.33 m³/m² day. This performance did not change after 24 hours' operation on a fresh sodium chloride solution.

EXAMPLE 4

A cellulose acetate asymmetric membrane was immersed in an aqueous solution containing 0.15% of sodium bicarbonate and sodium carbonate for 20 hours at 30° C., in which the pH was 11. By this immersion the membrane performance was reduced by hydrolysis, the salt rejection decreased to 95.0% from 98.0% and the water flux increased to 0.70 m³/m².day from 0.60 m³/m².day under the following conditions:

| Feed | 0.25% sodium chloride |
|---|---|
| Temperature | 25° C. |
| Operating pressure | 30 Kg/cm² |

30 ppm of the modified vinyl polymer obtained in Example 1 were added to the solution and the evaluation was continued for an hour. The membrane performance was rejuvenated, and found to exhibit a salt rejection of 97.7% and a water flux of 0.60 m³/m².day, which was maintained after 24 hours' operation using a fresh feed solution.

EXAMPLE 5

Asymmetric cellulose acetate membranes were piled on a polyethylene net ("Vexar" made by E. I. duPont de Nemours & Co.) and evaluated under the following conditions:

| Feed | 0.15% NaCl |
|---|---|
| Operating Pressure | 30 Kg/cm² |
| Temperature | 25° C. |

The membrane performance was degenerated by deformation. The membrane treatment was performed by using the modified vinyl polymer of Example 1, while the concentration was changed. The results are listed in Table 1.

TABLE 1

| Before Treatment (degenerated) Rejection (%) | Water flux | Modified Vinyl Polymer (concentration) (ppm) | After Treatment (one hour) Rejection (%) | Water flux (m³/m² day) |
|---|---|---|---|---|
| 80.1 | 1.13 | 0.5 | 95.8 | 0.76 |
| 82.7 | 1.06 | 7.5 | 97.8 | 0.67 |
| 82.5 | 1.08 | 15.0 | 98.0 | 0.67 |
| 82.5 | 1.10 | 30 | 98.5 | 0.60 |

EXAMPLE 6

The spirally wound cellulose acetate membrane element for sea water desalination (SC-5100 made by Toray, Inc. of Tokyo, Japan), exhibited a salt rejection of 96% and a water flux of 2.1 m³/day.element under the following conditions:

| Operating Pressure | 56 Kg/cm² |
|---|---|
| Brine Flow Rate | 8 liters/min. |
| Recovery | 16% |
| Feed Concentration | 3.5% sodium chloride |

30 ppm of modified vinyl polymer was added to the feed solution, and after 5 hours' operation the salt rejection was improved to 99.24% and the water flux was reduced to 1.6 m³/day.element. This performance was maintained for 24 hours after the feed solution was changed to a fresh 3.5% sodium chloride solution.

EXAMPLE 7

A spirally wound cellulose acetate membrane element for brackish water desalination (SC-3100 made by Toray, Inc. of Tokyo, Japan) exhibited 98.1% salt rejection and 3.91 m³/day.element water flux under the following conditions:

| Operating Pressure | 30 Kg/cm² |
|---|---|
| Temperature | 25° C. |
| Feed Solution | 0.15% sodium chloride |
| Recovery | 30% |

The membrane treatment was performed as in Example 6. After 5 hours' operation salt rejection improved to 99.3% and the water flux was 3.33 m³/day.element. Improved performance was maintained after 540 hours operation followed by treatment; the membrane exhibited 99.2% salt rejection and 3.2 m³/day.element water flux.

EXAMPLE 8

A cellulose acetate asymmetric reverse osmosis membrane was evaluated in the same manner as in Example 2, but the membrane was deformed as in Example 5. The membrane performance was 88% salt rejection and 0.4 m³/m².day water flux. This membrane was regenerated to 97% salt rejection and 0.32 m³/m².day water flux, after the membrane treatment using an aqueous solution containing 50 ppm of the modified vinyl polymer of Example 1. This effect is also illustrated in FIG. 1, where (2) is degenerated membrane performance and (3) is rejuvenated membrane performance.

EXAMPLE 9

A two stage water desalination system using spirally wound cellulose acetate membrane elements was degenerated after 4000 hours operation. The degenerated performance of the first stage was rejuvenated by applying the membrane treating agent of Example 3.

The rejection performance of the membrane element recovered from 91% to 93% with slight decrease of flux. The membrane treating agent was added at a level of 5 ppm in sea water for 10 minutes. This effect was maintained after 2000 hours operation which followed.

We claim:

1. A semipermeable membrane for liquid separation, having a structure which is permeable to liquid, and having improved rejection performance, in which the semipermeable membrane has attached thereto an effective amount of a modified vinyl polymer having a main vinyl chain and an acetoxy side group bonded to the main vinyl chain and at least one other side group, bonded to the main vinyl chain, selected from the group consisting of groups represented by Formula (I) and (II) as follows:

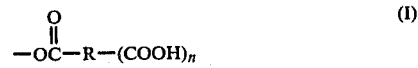

and

-continued

—O—R—(COOH)$_n$ (II)

wherein R is a radical selected from the group consisting of aliphatic, aromatic and heterocyclic radicals having from 1 to 9 carbon atoms, and n is an integer from 1 to 3.

2. A semipermeable membrane having attached thereto a membrane treating agent according to claim 1, wherein the group represented by the Formulas (I) and (II) comprises at least one group selected from the group consisting of:

 (A)

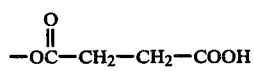 (B)

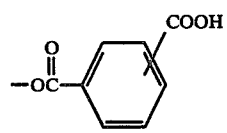 (C)

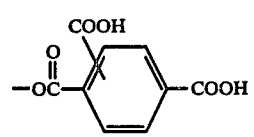 (D)

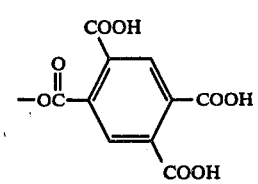 (E)

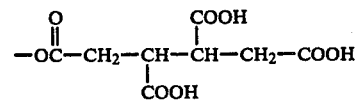 (F)

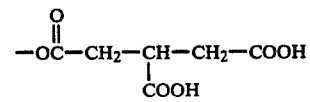 (G)

—O—CH$_2$—COOH (H)

—O—CH$_2$—CH$_2$—COOH (I)

3. A semipermeable membrane having attached thereto a membrane treating agent according to claim 1, wherein said modified vinyl polymer is a vinyl polymer derived from a homopolymer or copolymer of vinyl acetate.

4. A semipermeable membrane having attached thereto a membrane treating agent according to claim 1, wherein said modified vinyl polymer is a vinyl polymer represented by the Formula (III):

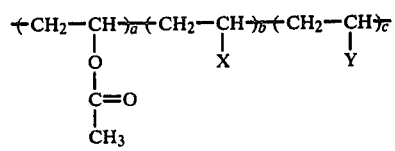 (III)

wherein a, b, and c are molar fractions and satisfy the following equations:

a+b+c=1

0.9>a>0.2

0.8>b>0.1

0.4>c≧0

X is at least one radical selected from the group represented by the Formulas (I) and (II), Y is at least one radical selected from the group consisting of —OH, —H, —Cl, —Br, —I, —C$_6$H$_5$ and

5. A semipermeable membrane having attached thereto a membrane treating agent according to claim 4, wherein X is at least one radical selected from the group consisting of:

—OC(=O)—CH=CH—COOH (A)

—OC(=O)—CH$_2$—CH$_2$—COOH (B)

(C)

(D)

(E)

(F)

(G)

—O—CH$_2$—COOH (H)

—O—CH$_2$—CH$_2$—COOH (I)

6. A semipermeable membrane having attached thereto a membrane treating agent according to claim 4, wherein X is represented by

  (A)

or

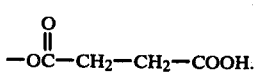  (B)

7. A semipermeable membrane having attached thereto a membrane treating agent according to claim 4, wherein Y is —OH.

8. A semipermeable membrane having attached thereto a membrane treating agent according to claim 4, wherein x is a radical represented by

  (A)

or

  (B)

9. A semipermeable membrane having attached thereto a membrane agent according to claim 4, wherein a, b, and c satisfy the following equations:

$0.8 > a > 0.4$, $0.4 > b > 0.1$ $0.2 > c \geq 0$

10. A semipermeable membrane having attached thereto a membrane treating agent according to claim 1, wherein said modified vinyl polymer is derived from at least one polymer selected from the group consisting of polyvinyl acetate, copolymers comprising the reaction product of vinyl acetate and at least one comonomer of ethylene, vinyl chloride, styrene, N-vinyl pyrrolidone, and their partially or fully saponfied polymers.

11. A semipermeable membrane having attached thereto a membrane treating agent according to claim 1, wherein the modified vinyl polymer is a polymer comprising the reaction product of (a) at least partially saponified polyvinyl acetate, its copolymers and their partially or fully saponified polymers and (b) at least one compound selected from the group consisting of dibasic acids, tribasic acids, tetrabasic acids, acid anhydrides thereof and acid chlorides thereof.

12. A semipermeable membrane having attached thereto a membrane treating agent according to claim 11, wherein at least one compound of group (b) is selected from the group consisting of maleic acid, succinic acid, phthalic acid, malonic acid, propane tricarboxyl acid, butane tetracarboxylic acid and trimellitic acid, their acid anhydrides and their acid chlorides.

13. A semipermeable membrane having attached thereto a membrane treating agent according to claim 1, wherein the modified vinyl polymer is a polymer comprising the reaction product of partially saponified polyvinyl acetate and maleic acid anhydride.

14. A semipermeable membrane according to claim 1, wherein the semipermeable membrane comprises cellulose ester.

15. A semipermeable membrane according to claim 1, wherein the semipermeable membrane comprises cellulose acetate or a mixture of cellulose acetate and another cellulose ester.

16. A semipermeable membrane according to claim 1, wherein the semipermeable membrane comprises a polyamide.

17. A semipermeable membrane according to claim 1, wherein the semipermeable membrane has at least 98.5% of rejection performance operated at 30 Kg/cm$^2$, with an aqueous solution containing by weight 0.5% NaCl, at a temperature of 25° C., and at a pH of 6.

18. A semipermeable membrane according to claim 1, wherein the semipermeable membrane has at least 99% of salt rejection, operated at 30 Kg/cm$^2$, with an aqueous solution containing by weight 0.5% NaCl, at a temperature of 25° C., and at a pH of 6.

19. A reverse osmosis membrane of the cellulose acetate series, having a structure which is permeable to liquid, and having attached thereto a membrane treating agent for rejuvenating or improving rejection performance of said reverse osmosis membrane said membrane treating agent containing an effective amount of a modified vinyl polymer having a main vinyl chain and an acetoxy side group bonded to the main vinyl chain and at least one side group, bonded to the main vinyl chain, selected from the group consisting of:

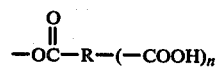  (I)

and

  (II)

wherein R is a radical selected from the group consisting of aliphatic, aromatic and heterocyclic radicals having from 1 to 9 carbon atoms, and n is an integer from 1 to 3.

20. A membrane treated with a treating agent according to claim 19, wherein the membrane treating agent is applied in a concentration of about 0.0001 to about 1% by weight of a feed water.

21. A membrane treated with a treating agent according to claim 19, wherein the membrane treating agent is applied in an aqueous solution in a concentration of about 0.0003 to 0.01% by weight of a feed water.

22. A membrane according to claim 21, wherein the feed water has a pH of about 3 to 9.

23. A membrane according to claim 21, wherein the feed water has a pH of about 4 to 8.

* * * * *

UNITED STATES PATENT AND TRADEMARK OFFICE
CERTIFICATE OF CORRECTION

PATENT NO. : 4,478,717

DATED : October 23, 1984

INVENTOR(S) : Masaru Kurihara and Tadahiro Uemura

It is certified that error appears in the above-identified patent and that said Letters Patent is hereby corrected as shown below:

Column 3, Formula I:
$$"\underset{-C-R-(-COOH)n}{\overset{O}{\|}}"$$

should read:
$$--\underset{OC-R-(-COOH)_n}{\overset{O}{\|}}$$

Signed and Sealed this

Tenth Day of September 1985

[SEAL]

*Attest:*

DONALD J. QUIGG

*Attesting Officer*   *Acting Commissioner of Patents and Trademarks - Designate*